Patented July 21, 1925.

1,546,876

UNITED STATES PATENT OFFICE.

MORRIS L. WEISS, OF NEWARK, NEW JERSEY, ASSIGNOR TO DOVAN CHEMICAL CORPORATION, OF WILMINGTON, DELAWARE, A CORPORATION OF DELAWARE.

RUBBER VULCANIZATION.

No Drawing.  Application filed December 29, 1923. Serial No. 683,321.

*To all whom it may concern:*

Be it known that I, MORRIS L. WEISS, a citizen of the United States, residing at Newark, county of Essex, State of New Jersey, have invented certain new and useful Improvements in Rubber Vulcanization, of which the following is a full, clear, concise, and exact description.

My invention relates to the process of vulcanizing rubber and similar vulcanizable gums, and particularly to the ingredients used therein to produce improved vulcanized rubber goods, and also to shorten the time required for vulcanization and to accelerate the vulcanizing action.

In my prior Patent No. 1,411,231, issued March 28, 1922, for "vulcanization accelerator," I have described and claimed a substance known as diphenylguanidine which when used in rubber vulcanization greatly improves the elasticity, tensile strength and aging qualities of rubber, in addition to materially shortening the time required for applying the vulcanizing heat, as well as reducing the amount of heat.

In my prior Patent No. 1,422,506, issued July 11, 1922, for "process of making diphenylguanidine," I have described and claimed an economical process for manufacturing said diphenylguanidine commercially.

Subsequent to the issue of said patents, the diphenylguanidine salt of phenyl-dithiocarbamic acid and other diphenylguanidine salts apparently have been considered by several rubber chemists and mentioned in the literature. In an article published in Industrial and Engineering Chemistry for March 1923 (p. 286) Winfield Scott has considered such salts and he gives several observations as to the characteristics of phenyl-dithio-carbamic acid. However, said article does not suggest the use of guanidine salts of disubstituted dithiocarbamic acid which are stable and are much more efficacious as accelerators than the diphenylguanidine salt of the phenyldithiocarbamic acid suggested whose accelerative value was not discussed or commented upon and which I have found to be of very little, if any, value as an accelerator.

The object of the present invention is to produce an accelerator which is an improvement for certain purposes over the accelerator described in the above-mentioned patents, and which also will have other advantages in connection with the vulcanization of rubber goods to which only low vulcanizing temperatures may be applied for short periods in order to produce a finished rubber compound of unusually high elasticity and durability, such as in rubber sheeting, inflatable toys, rubber goods used for medical and surgical purposes and rubber cements.

These results are accomplished by the addition to rubber compounds before vulcanization of certain organic substances known as reaction products of disubstituted guanidines with dithiocarbamic acid formed from secondary amines which, through their catalytic or other similar action, greatly reduce the time required for vulcanization and at the same time produce a very superior vulcanized rubber product. I am well aware that heretofore certain organic dithiocarbamates have been used to some extent in rubber vulcanization for this purpose, but have proved to be unsatisfactory, owing to their lack of stability. Among the organic derivatives of dithiocarbamates are such salts as dimethylammoniumdimethyldithiocarbamate and other amino salts of substituted dithiocarbamic acid. Metallic salts of substituted dithiocarbamic acid have also been used to some extent in rubber vulcanization, but their use has been of limited application. The amino salts of the substituted dithiocarbamic acids described in the chemical literature are very unstable being easily oxidized in air, which results in their decomposition after standing for a short time, making them undesirable for use in the vulcanization of rubber compounds or otherwise.

My object therefore in developing the present invention was to obtain stable salts of disubstituted dithiocarbamic acids which could be produced in stable condition by substituting guanidine radicals for alkyl or aryl amino radicals, so that said salts could be made available in the rubber industry to produce greatly improved vulcanization in certain classes of rubber goods as well as to shorten the time of cure. Following my experience with diphenylguanidine, in which its stability and basic properties were fully demonstrated, I have definitely proved that substitution of a guanidine radical in the salts of a disubstituted dithiocarbamic acid give the desired results. This conclusion is the result of a series of investigations with these substances and I have discovered that the reaction products of disubstituted guanidines with dithiocarbamic acid formed from secondary amines produce most satisfactory results in the rubber vulcanization as a vitalizer or accelerator, particularly where low temperatures are desirable. In such salts the guanidine radical may be a substituted guanidine of the aliphatic, alicyclic or aromatic series and the dithiocarbamic acid may be a disubstituted aliphatic or aromatic dithiocarbamic acid or an alicyclic dithiocarbamic acid. These have proved to be very stable in contact with air and at temperatures below their melting points. They are very efficacious as vitalizers or accelerators in the vulcanization of rubber goods, particularly the kinds above mentioned.

These substances may be produced by direct condensation of a secondary amine with carbonbisulphide in the presence of the guanidine radical.

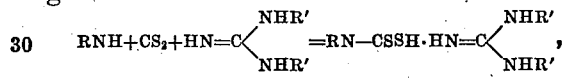

where R represents two alkyl or two aromatic groups or one of each, and R' represents one aliphatic, alicyclic or aromatic group. Where R represents groups other than the alicyclic group I prefer to write the formula

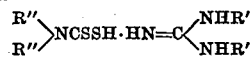

where R'' represents an aliphatic or aromatic group.

On the other hand, a guanidine salt may be made to react upon a metallic salt of disubstituted dithiocarbamic acid, as follows:

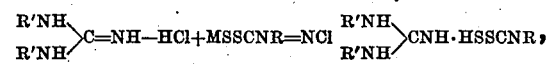

R and R' are as defined in the formula just preceding and M represents a metal or its equivalent.

These substances, particularly the reaction products of diphenyl guanidine with dimethyl dithiocarbamic acid and ditolyl guanidine with dimethyl dithiocarbamic acid, are of a crystalline nature, are particularly stable when exposed to air, and can consequently be ground to an extremely fine powder which enables them to be used most efficiently in the compounding of rubber mixes by the usual methods employed in the rubber industry. They have definite melting points and dissolve in the rubber mix when the latter is milled on the mixing rolls. These salts are not basic in character and may be heated to a temperature up to their melting points without being decomposed. They are soluble in water and may be easily recrystallized therefrom. Furthermore, they do not affect the original color of a rubber mix or compound, nor do they impart any offensive odor thereto, or cause the mix to give off any poisonous fumes.

A general method of preparing the above-mentioned salts of disubstituted or alicyclic dithiocarbamic acid which will be understood by the chemists skilled in the art may be stated as follows:

A secondary amine, such as dimethylamine, monoethylaniline, etc., is condensed with carbonbisulphide in alcohol, or other solvent, in the presence of a guanidine, preferably diphenyl or ditolyl guanidine, or by producing the reaction in water, or other solvent, to which is added a soluble salt of a disubstituted dithiocarbamic acid, preferably dimethyldithiocarbamic acid which reacts upon the soluble salt of a guanidine, preferably diphenyl or ditolylguanidine-hydrochloride. Instead of dimethyldithiocarbamic acid an alicyclic compound may be used, such as piperidine dithiocarbamic acid. These resulting compounds employing dimethyl dithiocarbamic acid have a structure indicated as follows:

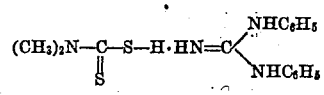

which is the reaction product of diphenyl guanidine and dimethyl dithiocarbamic acid

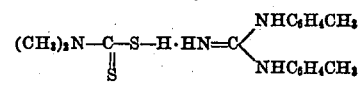

which is the reaction product of ditolyl guanidine and dimethyl dithiocarbamic acid.

As an example of the practical use of these substances in compounding and vulcanizing rubber, the following formula is given:

100 parts by weight of crepe rubber.
3 parts zinc oxide.
1½ parts of sulphur.
.5 part the reaction product of diphenyl or ditolyl guanidine with dimethyl dithiocarbamic acid.

This compound may be satisfactorily cured in a mold or otherwise for fifteen minutes at a temperature of 228° F.

Rubber compounds cured under these conditions are found to possess extremely good qualities as regards elasticity, elongation, durability and tensile strength, particularly where thin rubber goods are manufactured which have heretofore required other organic salts of less stability and of less satisfactory effect and action.

Owing to the low temperature required in vulcanizing, about five pounds steam pressure, there is no danger of over curing or burning the rubber and the comparatively small sulphur content required, being about one and one half per cent of the rubber used, shows that my improved accelerators are very powerful and economical beside having many advantageous effects on the quality of the final rubber products, especially as regards their aging qualities.

It will be understood that instead of adding the reaction product of a disubstituted guanidine with a dithiocarbamic acid formed with a secondary amine, the ingredients themselves, namely the secondary amine and carbon disulphide used in forming the substituted dithiocarbamic acid and the substituted guanidine, may be added to the rubber as such. This addition of the separate ingredients may be carried on if desired during the milling of the rubber. When the rubber has been combined with the ingredients in this manner, the accelerator will be formed thereafter by interaction of the ingredients in the rubber mass. The addition of the ingredients in this manner is preferably carried out with the employment of solid or liquid ingredients. Gaseous ingredients are not conveniently combined in this way unless added in solution.

I do not wish to be understood as being limited to specific proportions or methods of procedure above set forth for various changes may be made by those skilled in the art without departing from the spirit and scope of my invention.

Having thus described my invention, what I claim and desire to protect by Letters Patent is:

1. A vulcanized compound of rubber or similar material having as an ingredient before vulcanization, a substance having the formula—

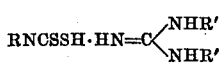

2. A vulcanized compound of rubber or similar material having as an ingredient before vulcanization, a substance having the formula—

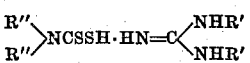

where R″ is an alkyl radical.

3. A vulcanized compound of rubber or similar material having as an ingredient before vulcanization, a substance having the formula—

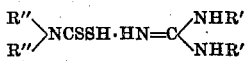

where R′ is an aromatic radical.

4. A vulcanized compound of rubber or similar material having as an ingredient before vulcanization, a substance having the formula—

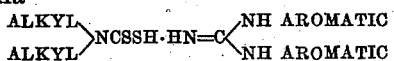

5. A vulcanized compound of rubber or similar material, having as an ingredient before vulcanization, a salt comprising diphenylguanidine combined with dimethyldithiocarbamic acid.

6. The process of treating rubber or similar material which comprises combining with rubber a substance having the formula—

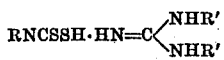

7. The process of treating rubber or similar material which comprises combining with rubber a substance having the formula—

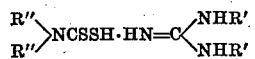

where R″ is an alkyl radical.

8. The process of treating rubber or similar material which comprises combining with rubber a substance having the formula—

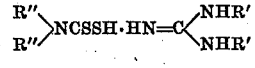

where R′ is an aromatic radical.

9. The process of treating rubber or similar material which comprises combining with rubber a substance having the formula—

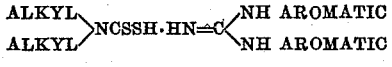

10. The process of treating rubber or a similar material, which comprises combining with a rubber compound a vulcanizing agent and a salt consisting of diphenylguanidine combined with dimethyldithiocarbamic acid.

11. A vulcanized compound of rubber or similar material having as ingredients before vulcanization rubber, a compound of zinc, sulphur and a reaction product of a disubstituted guanidine with a disubstituted dithiocarbamic acid.

12. A process of treating rubber which comprises combining therewith a compound of zinc, sulphur and a reaction product of diphenyl guanidine and dimethyl dithiocarbamic acid, and vulcanizing the rubber.

Signed at New York, N. Y., this 24th day of December, 1923.

MORRIS L. WEISS.